(12) United States Patent
Towata

(10) Patent No.: US 9,110,623 B2
(45) Date of Patent: Aug. 18, 2015

(54) PRINTING SYSTEM, PRINT RELAY SERVER, METHOD OF CONTROLLING THE SERVER, AND PROGRAM

(75) Inventor: Hiroaki Towata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/009,409

(22) PCT Filed: Apr. 12, 2012

(86) PCT No.: PCT/JP2012/002528
§ 371 (c)(1),
(2), (4) Date: Oct. 2, 2013

(87) PCT Pub. No.: WO2012/144164
PCT Pub. Date: Oct. 26, 2012

(65) Prior Publication Data
US 2014/0022594 A1 Jan. 23, 2014

(30) Foreign Application Priority Data
Apr. 22, 2011 (JP) ................................. 2011-096235

(51) Int. Cl.
*G06F 3/12* (2006.01)
(52) U.S. Cl.
CPC ............ *G06F 3/1293* (2013.01); *G06F 3/1208* (2013.01); *G06F 3/1247* (2013.01); *G06F 3/1288* (2013.01)

(58) Field of Classification Search
None
See application file for complete search history.

(56) References Cited

U.S. PATENT DOCUMENTS

| 2004/0026870 | A1 | 2/2004 | Maguire |
| 2006/0262665 | A1* | 11/2006 | Cho ................................. 369/1 |
| 2007/0263248 | A1* | 11/2007 | Oshima et al. ............... 358/1.15 |
| 2010/0161764 | A1* | 6/2010 | Ono et al. ..................... 709/219 |

FOREIGN PATENT DOCUMENTS

| EP | 1 489 488 | 12/2004 |
| JP | 2003-76526 | 3/2003 |
| JP | 2003-196054 | 7/2003 |
| JP | 2005-100340 | 4/2005 |
| JP | 2005-100341 | 4/2005 |
| JP | 2005-100342 | 4/2005 |
| JP | 2006-133877 | 5/2006 |

* cited by examiner

*Primary Examiner* — Fan Zhang
(74) *Attorney, Agent, or Firm* — Fitzpatrick, Cella, Harper & Scinto

(57) ABSTRACT

The present invention provides a mechanism to acquire content that has not been converted into print data from a vendor server providing a print service.
The mechanism acquires content data corresponding to content identification information from an application server if location information about print data acquired on the basis of the content identification information that is acquired coincides with location information about print data included in notification information that is acquired.

10 Claims, 16 Drawing Sheets

Fig. 8B

| 1301 | 1302 | 1303 | 1304 | 1305 | 1306 |
|---|---|---|---|---|---|
| Virtual Printer ID | Service Name | Real Printer ID | Printer Kind | Service Printer ID | Name |
| VPBCH-8EA1CB19-5D9E | Print Service A | RP-E2B53416-B536 | AAA | SP-5D15DEAF-BE3C | Printer 1 |
| VPBCH-94E1E881-BEFA | Print Service A | RP-E5BF5531-CAF9 | AAB | SP-2336ACD3-4D27 | Printer 2 |
| VPBCH-D24B4912-2866 | Print Service A | RP-677F2761-B68D | AAC | SP-1AE5A901-3D8C | Printer 3 |
| VPBCH-40BDE35B-A6D4 | Print Service B | RP-2080F643-FB08 | AAD | SP-F5C17CC0-1877 | Printer 4 |
| VPBCH-A4DB3F7A-0123 | Print Service B | RP-DE0E88F6-6115 | AAE | SP-4120C0A0-99A3 | Printer 5 |

Fig. 8C

| 1401 | 1402 | 1403 | 1404 | 1405 | 1406 |
|---|---|---|---|---|---|
| Service Printer ID | Name | Capabilities | Virtual Printer ID | User Name | Password |
| SP-5D15DEAF-BE3C | Printer 1 | · · · | VPBCH-8EA1CB19-5D9E | User A | User A |
| SP-2336ACD3-4D27 | Printer 2 | · · · | VPBCH-94E1E881-BEFA | User A | User A |
| SP-1AE5A901-3D8C | Printer 3 | · · · | VPBCH-D24B4912-2866 | User A | User A |
| SP-F5C17CC0-1877 | Printer 4 | · · · | VPBCH-40BDE35B-A6D4 | User A | User A |
| SP-4120C0A0-99A3 | Printer 5 | · · · | VPBCH-A4DB3F7A-0123 | User B | User B |

Fig. 9A

| UI for registration in print service | |
|---|---|
| Print service: | [▼] — 901 |
| | Print Service A |
| | Print Service B |
| User ID: | [ ] — 902 |
| Password: | [ ] — 903 |
| 904 — ☐ Improve print quality and performance with conversion engine | |
| | [Registration] — 905 |

Fig. 9B

| Print setup UI | |
|---|---|
| Screen setting: | [▼] |
| | 1-Side Printing |
| | 2-Side Printing |
| Color setting: | [▼] |
| | Color |
| | Mono |
| Page size: | [▼] |
| | B5 |
| | A4 |
| | A3 |
| | [Execute] |

Fig. 10A

```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

Fig. 10B

```
<PrintSettings>
    <Duplex>
        <Item>2-Side</Item>
    </Duplex>
    <Color>
        <Item>mono</Item>
    </Color>
    <PaperSize>
        <Item>A4</Item>
    </PaperSize>
</PrintSettings>
```

Fig. 10C

```
<PrintJob>
    <id>
        <Item>5846759561318635695</Item>
    </id>
    <title>
        <Item>Doc1</Item>
    </title>
    <status>
        <Item>QUEUED</Item>
    </status>
    <dataUrl>
        <Item>http://prt.srv.com/data/5846759561318635695</Item>     1701
    </dataUrl>
    <settingUrl>                                                     1702
        <Item>http://prt.srv.com/setting/5846759561318635695</Item>
    </settingUrl>
</PrintJob>
```

Fig. 10D

```
<PrintJob>
   <id>
      <Item>5846759561318635695</Item>
   </id>
   <title>
      <Item>Doc1</Item>
   </title>
   <status>
      <Item>QUEUED</Item>
   </status>
   <dataUrl>
      <Item>http://vprinter.com/VP8CH67YXF42BBF2TQ449H8XA
         /data/5846759561318635695</Item>
   </dataUrl>
   <settingUrl>
      <Item>http://vprinter.com/VP8CH67YXF42BBF2TQ449H8XA
         /setting/5846759561318635695</Item>
   </settingUrl>
</PrintJob>
```

1703 — dataUrl
1704 — settingUrl

Fig. 11

```
"jobs": [
  {
    "id": "58467595613186356 95",
    "title": "Doc1",
    "status": "QUEUED",
    "dataUrl": "http://vprinter.com/VP8CH67YXF42BBF2TQ449H8XA/data/58467595613186356 95",
    "settingUrl": "http://vprinter.com/VP8CH67YXF42BBF2TQ449H8XA/setting/58467595613186356 95"
  }
]
```

PRINTING SYSTEM, PRINT RELAY SERVER, METHOD OF CONTROLLING THE SERVER, AND PROGRAM

This application is a national stage application under 35 U.S.C. §371 of International Application No. PCT/JP2012/002528, having an International filing date of Apr. 12, 2012, which claims priority to Japan 2011-096235, filed on Apr. 22, 2011, the contents of each of which are incorporated by reference as if set forth in full herein.

TECHNICAL FIELD

The present invention relates to a printing system including a Web server providing a print service and an image forming apparatus, a print relay server, a method of controlling the print relay server, and a program.

BACKGROUND ART

Technologies in related art are known in which print instructions are transmitted from clients to servers and the servers, which have received the print instructions, convert content to be printed into print data.

Japanese Patent Laid-Open No. 2003-196054 discloses a method in which a server receives a print instruction and information for controlling the printing from a client and the server generates print data on the basis of the information for controlling the printing. The server in Japanese Patent Laid-Open No. 2003-196054 provides a service of generating the print data to the client.

As described above, the provision of services from servers to clients has been hitherto realized in various modes. Cloud computing attracting increasing attention in recent years is also included in the modes in which servers provide services to clients. The cloud computing features spread of data conversion and data processing to many computing resources to simultaneously process requests from many clients. Many vendors currently exist which install Web services in a cloud computing environment in which the cloud computing is realized to provide a wide variety of services.

One of the most remarkable vendors is Google (registered trademark). Google (registered trademark) builds many large data centers and proposes services that are provided in association with devices to make active movements, such as development of data communication mechanisms between the devices and the services. For example, Google (registered trademark) has developed a data communication mechanism to provide services in association with image forming apparatuses to release an interface through which the image forming apparatuses establish the data communication with the cloud computing environment prepared by Google (registered trademark). The installation of this interface in the image forming apparatuses has an advantage in that there is no need to install printer drivers in the clients, as in Japanese Patent Laid-Open No. 2003-196054. In addition, the installation of this interface in the image forming apparatuses allows the clients to specify image forming apparatuses where the printing is performed even if the image forming apparatuses are connected to the server via the Internet.

However, there are problems described below when vendor servers in the cloud computing environment generate print data.

A first problem is that, when the quality of print data generated in applications on the vendor servers is low, the print quality in the entire printing system using the print data is also lowered. A second problem is that there is a case in which the image forming apparatuses cannot print the print data provided by the vendor servers. In such a case, after relay servers acquire the print data from the vendor servers, it is necessary to convert the print data into a format printable in the image forming apparatuses again. The data conversion is performed multiple times to possibly degrade the print quality. A third problem is that there is a case in which the print data generated by the vendor servers is largely increased in size. In this case, the time for the relay servers to acquire the print data over networks can be increased. This is because it is necessary to decompose data in the applications, composed of font data or vector data, into the print data. A fourth problem is that there is a case in which it is not possible to acquire content from the vendor servers on the basis of information concerning the printing, received from the vendor servers. Such a problem occurs because the interface mechanism to acquire the content released by the vendor servers is not based on the information concerning the printing received from the vendor servers. This problem can be resolved if the information concerning the printing received from the vendor servers has sufficient information necessary to acquire the content. However, there is no assurance that the content can be constantly acquired because the information that can be received is determined by the vendor servers.

SUMMARY OF THE INVENTION

The present invention provides a mechanism to acquire content that has not been converted into print data from a vendor server providing a print service in order to resolve at least one of the problems described above.

According to an embodiment, a print relay server is capable of communicating with an application server, a print server, and an image forming apparatus. The application server provides a Web service for generating content data to a client and stores the content data generated by the client by using the provided Web service. The print server provides print data generated on the basis of the content data stored in the application server to a destination. The image forming apparatus includes a print unit that performs printing on the basis of the print data. The print relay server includes a notification information acquiring unit configured to acquire notification information that is transmitted by the print server to provide the print data to the destination and that includes common information commonly added to both the content data and the print data; an identification information acquiring unit configured to acquire content identification information for identifying the content data to which the acquired common information is added from the application server; a data acquiring unit configured to acquire the content data corresponding to the content identification information from the application server if location information about the print data acquired on the basis of the acquired content identification information coincides with location information about the print data included in the acquired notification information; a print data generating unit configured to generate the print data on the basis of the acquired content data; and a transmitting unit configured to transmit the print data generated by the print data generating unit to the image forming apparatus.

The present invention therefore proposes a mechanism to acquire content that has not been converted into print data from a vendor server providing a print service. With the proposition, it is possible to improve conversion quality of the print data.

BRIEF DESCRIPTION OF DRAWINGS

FIG. 8B illustrates information stored in a print service information manager.

FIG. 8C illustrates an example of information stored in a printer information storage part.

FIG. 9A illustrates an example of a registration UI.

FIG. 9B illustrates an example of a print setup UI.

FIG. 10A illustrates Capabilities represented in an XML format.

FIG. 10B illustrates a print setting represented in the XML format.

FIG. 10C illustrates notification information represented in the XML format.

FIG. 10D illustrates other notification information represented in the XML format.

FIG. 11 illustrates the other notification information represented in a JSON format.

DESCRIPTION OF EMBODIMENTS

Embodiments of the present invention will herein be described with reference to the attached drawings.

The present invention concerns a print relay server apparatus relaying the environment of a vendor providing an interface to an image forming apparatus. The present invention provides higher conversion quality by the print relay server that acquires content that has not been converted into print data from the environment of the vendor providing a print service. However, there are cases in which a mechanism to acquire the content on the basis of information necessary for the printing, including the print data, is not released depending on the vendor providing the print service. In such cases, even when the print relay server receives the information necessary for the printing, it is not possible for the print relay server to acquire the content from the vendor server providing the print service. Accordingly, the present invention also provides a mechanism to acquire the content from the vendor server on the basis of limited information even if the interface to acquire the content on the basis of the information necessary for the printing is not released.

The content is data generated and/or edited by a user with an application installed in the environment of the vendor or a local computer. Typical content includes a word processor document, a spread sheet document, and a presentation document.

First Embodiment

Figure 1:
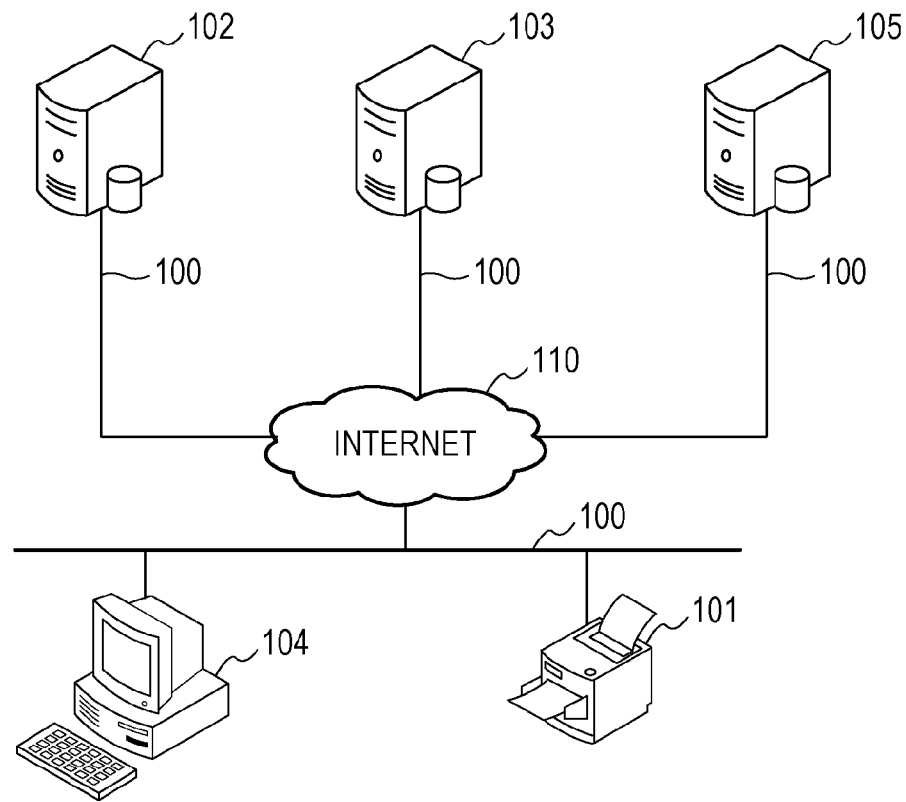
FIG. 1 illustrates an example of the configuration of a content printing system according to a first embodiment.

The configuration of a content printing system 1000 according to a first embodiment will now be described. FIG. 1 illustrates an example of the configuration of the content printing system 1000. Referring to FIG. 1, the content printing system 1000 includes a client computer 104 and an image forming apparatus 101. The client computer 104 and the image forming apparatus 101 are arranged in a user environment. The client computer 104 is connected to the image forming apparatus 101 over a network 100, which is connected to the Internet 110. The content printing system 1000 also includes a Web application server group 105 and a print server group 103. The two server groups 105 and 103 may be provided by the same vendor. The Web application server group 105 is connected to the print server group 103 over the network 100, which is connected to the Internet 110. The Web application server group 105 and the print server group 103 are connected to each other through the Internet 110 to be capable of communication.

Although the print server group 103 is connected to the Web application server group 105 over the network 100 in the first embodiment, the print server group 103 may be connected to the Web application server group 105 over the Internet 110. The content printing system 1000 further includes a print relay server 102. The print relay server 102 is connected to the network 100, which is connected to the Internet 110. The respective apparatuses and the respective server groups composing the content printing system 1000 are capable of being connected to each other over the Internet 110 to realize data communication. Although only one client computer 104, only one image forming apparatus 101, and only one print relay server 102 are provided in the content printing system 1000, multiple client computers 104, multiple image forming apparatuses 101, and multiple print relay servers 102 may be provided therein. Although the print server group 103 including multiple print servers and the Web application server group 105 including multiple Web application servers are provided in the content printing system 1000, only one print server and only one Web application server may be provided therein. In the first embodiment, the print relay server is referred to as a single print relay server and the print server group and the Web application server group are referred to as groups.

The Web application server provides a Web service for generating content data to the client and stores the content data generated by the client by using the provided Web service. The print server provides print data generated on the basis of the content data stored in the Web application server to a destination. The image forming apparatus includes a print unit that performs the printing on the basis of the print data. The print relay server acquires the print data to be provided to the destination from the print server or the Web application server.

Figure 2:
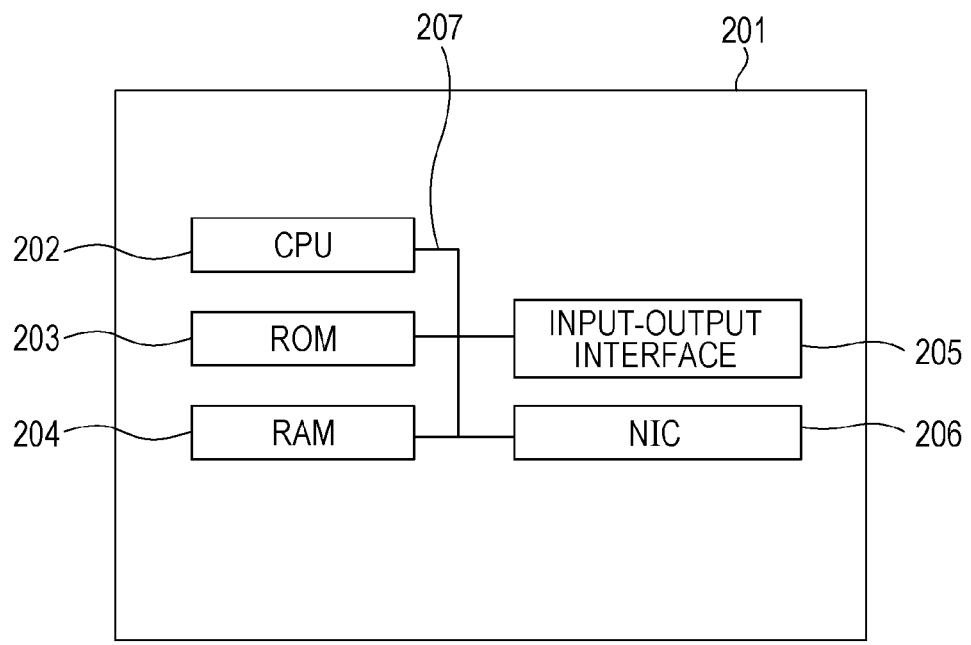
FIG. 2 is a block diagram illustrating an example of the hardware configuration of each apparatus and each server group composing the content printing system according to the first embodiment.

The hardware configuration of each apparatus and each server group composing the content printing system 1000 will now be described. FIG. 2 is a block diagram illustrating an example of the hardware configuration of each apparatus and each server group composing the content printing system 1000. Referring to FIG. 2, reference numeral 201 denotes each apparatus and each server group composing the content printing system 1000. Each apparatus and each server group includes a central processing unit (CPU) 202, a read only memory (ROM) 203, a random access memory (RAM) 204, an input-output interface 205, and a network interface card (NIC) 206. The CPU 202 executes various programs to realize a variety of functions. The ROM 203 stores various programs. The CPU 202 loads the programs stored in the ROM 203 into the RAM 204 to execute the programs. The RAM 204 is also used as a temporary working storage area for the CPU 202. The input-output interface 205 is an interface unit that transmits data to a display (not shown) connected to each apparatus and each server group and that receives data from a pointing device (not shown). Each apparatus and each server group composing the content printing system 1000 are connected to the network 100 through the NIC 206. The components described above are capable of transmitting and receiving data over a bus 207. The image forming apparatus 101 includes the print unit (not shown). The print unit is capable of transmitting and receiving data to and from each component over the bus 207. The print unit is capable of printing a raster image on a recording medium.

Figure 3:
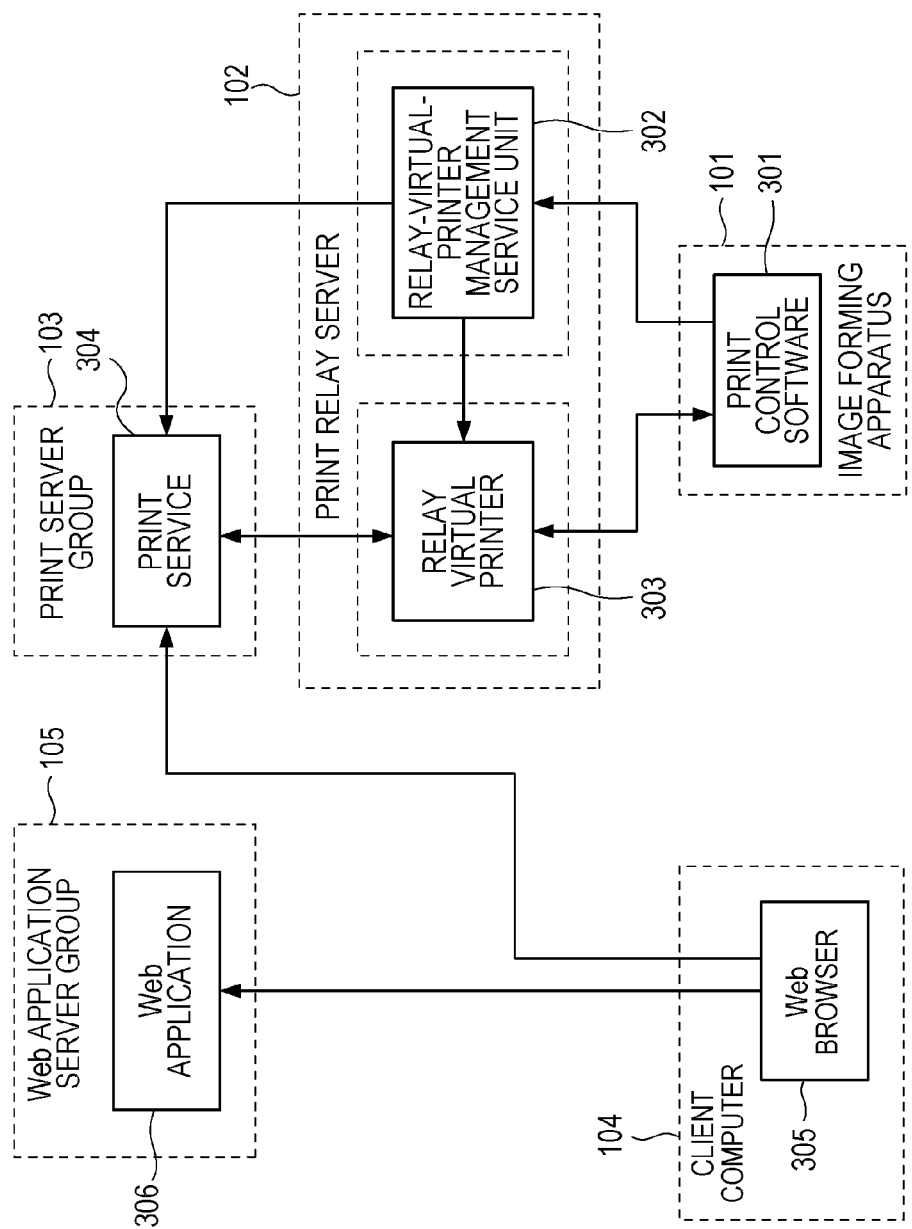
FIG. 3 is a block diagram illustrating an example of the software configuration of each apparatus and each server group composing the content printing system according to the first embodiment.

The functions of each apparatus and each server group composing the content printing system 1000 will now be described. FIG. 3 is a block diagram illustrating an example of the software configuration of each apparatus and each server group composing the content printing system 1000. The programs realizing the functions of the software components illustrated in FIG. 3 are stored in the ROM 203 in each apparatus and each server group. The CPU 202 loads the programs into the RAM 204 and executes the programs to realize the functions.

The functions of each apparatus and each server group described here are classified into two systems. A first system is a registration system in which the image forming apparatus 101 is registered in the print relay server 102, a relay virtual printer 303 is realized in the print relay server 102, and the relay virtual printer 303 is registered in a print service 304. A second system is a printing system in which an instruction to print content data generated in the Web application server group 105 is transmitted to the print server group 103 and the image forming apparatus 101 is caused to print print data on the basis of a print notification transmitted from the print server group 103. When the image forming apparatus 101 is caused to print the print data on the basis of information about the print notification transmitted from the print server group 103, the print server group 103 transmits the print notification to the image forming apparatus 101 via the print relay server 102, which is an intermediary, to cause the image forming apparatus 101 to print the print data.

Figure 4:
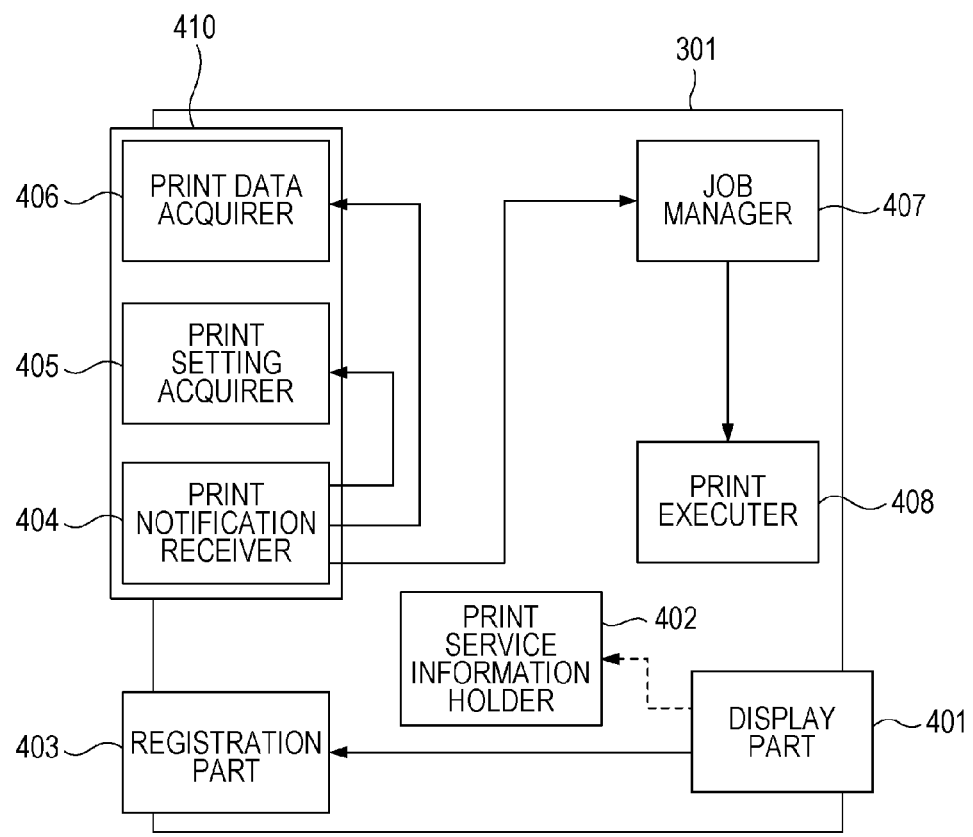
FIG. 4 illustrates functions realized by print control software.
Figures 7, 8A:
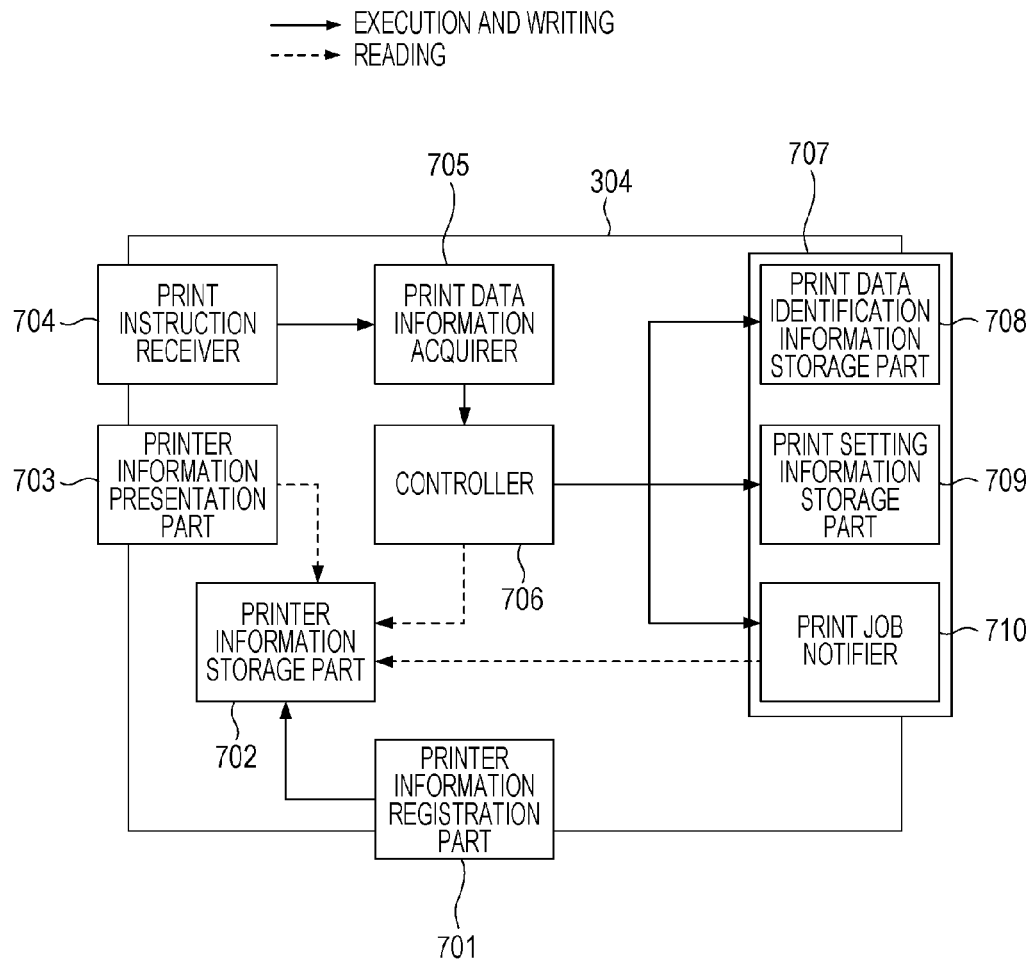
FIG. 7 illustrates functions realized by a print service.
FIG. 8A illustrates an example of print service information.

First, the functions classified as the registration system is described. The function classified as the registration system of the image forming apparatus 101 will now be described. The image forming apparatus 101 includes print control software 301. The print control software 301 realizes functions illustrated in FIG. 4. Referring to FIG. 4, a display part 401 displays various user interfaces (UIs). A print service information holder 402 holds print service information. FIG. 8A illustrates an example of the print service information. Although multiple pieces of print service information are illustrated in FIG. 8A, the print service 304 in the first embodiment corresponds to Print Service A. In response to an instruction to register the image forming apparatus 101 in the print service 304 from the user, the display part 401 generates and displays a UI for registration in print service, as illustrated in an example in FIG. 9A, on the basis of the information in FIG. 8A. The user selects a print service in which the image forming apparatus 101 is to be registered from a list box 901 in the user interface in FIG. 9A.

Since only one print service 304 is provided in the first embodiment, the user can select only Print Service A. The user inputs a user identifier (ID) and a password for the selected print service in a field 902 and a field 903, respectively. In addition, the user selects enabling of a print quality improvement function with a check box 904. When the print quality improvement function is enabled, it is possible to use a print quality improvement function and a print speed quality improvement function in the function classified as the printing system described below. Although the user can select the enabling of the print quality improvement function in the first embodiment, the print quality improvement function may be constantly enabled. In this case, the check box 904 may not be displayed.

Then, the user presses a Registration button 905. A registration part 403 in the print control software 301 issues registration information in response to the pressing of the Registration button 905 by the user. Although only the print service 304 is provided in the first embodiment, the user ID, the password, and the enabling of the print quality improvement function may be separately set for each print service when multiple print services can be selected.

The registration part 403 transmits the issued registration information to a request receiver 501 in a relay-virtual-printer management service unit 302 described below. The remaining functions in FIG. 4 will be described below.

The registration information will now be described. The registration information includes a print service name. The print service name is information for identifying a print service selected by the user and, specifically, is information for identifying the print service 304 in the print server group 103. The registration information also includes a user ID and a password. The user ID and the password are information necessary for using the print service 304 and the Web application server group 105. Such information is called user information. Since it is assumed that the Web application server group 105 and the print server group 103 are provided by the same vendor, the user can receive the services of both the Web application server group 105 and the print server group 103 with the same user information when the user uses the services provided by the Web application server group 105 and the print server group 103. The registration information further includes print quality improvement function information indicating enabling or disabling of the print quality improvement function. The print quality improvement function information is necessary for switching between the enabling and the disabling of the print quality improvement function in the function classified as the printing system described below. Even when the print quality improvement function is disabled, the print quality improvement function may be enabled after printing to perform the printing. In the first embodiment, the user registers the user information in the Web application server group 105 in advance.

The registration information further includes a Real Printer ID (RPID), which is specific identification information allocated to the image forming apparatus 101. The specific identification information is allocated to the respective image forming apparatuses (not shown) including the image forming apparatus 101 and each image forming apparatus is identified with this identification information. In the first embodiment, the RPID can be identified to identify the location where the image forming apparatus is arranged. The registration information further includes PrinterKind, which is model information indicating the model name of the image forming apparatus 101. The same model information is allocated to the same model. Two image forming apparatuses of the same model mean that the image forming apparatuses install the same communication module B'. The communication module B', a communication module A, a communication module A', and a communication module B will be described in detail below. The registration information further includes a printer name of the image forming apparatus 101. The printer name is a name allocated to the image forming apparatus 101 and the image forming apparatus 101 is called with the printer name. The printer name is different from the identification information and the image forming apparatuses may have the same printer name. The registration information further includes Capabilities. The Capabilities includes, for example, information indicating whether the image forming apparatus 101 supports duplex printing, information indicating whether the image forming apparatus 101 supports color printing, and information about available paper sizes. The Capabilities are the print function of the image forming apparatus 101. The Capabilities are transmitted to the request receiver 501 in an Extensible Markup Language (XML) format, as illustrated in an example in FIG. 10A. <Item> in FIG. 10A indicates a capability of the image forming apparatus 101. In the example in FIG. 10A, the image forming apparatus 101 supports the duplex printing and the color printing and the image forming apparatus 101 is capable of outputting sheets of paper of B5, A4, and A3 sizes.

Figure 5:
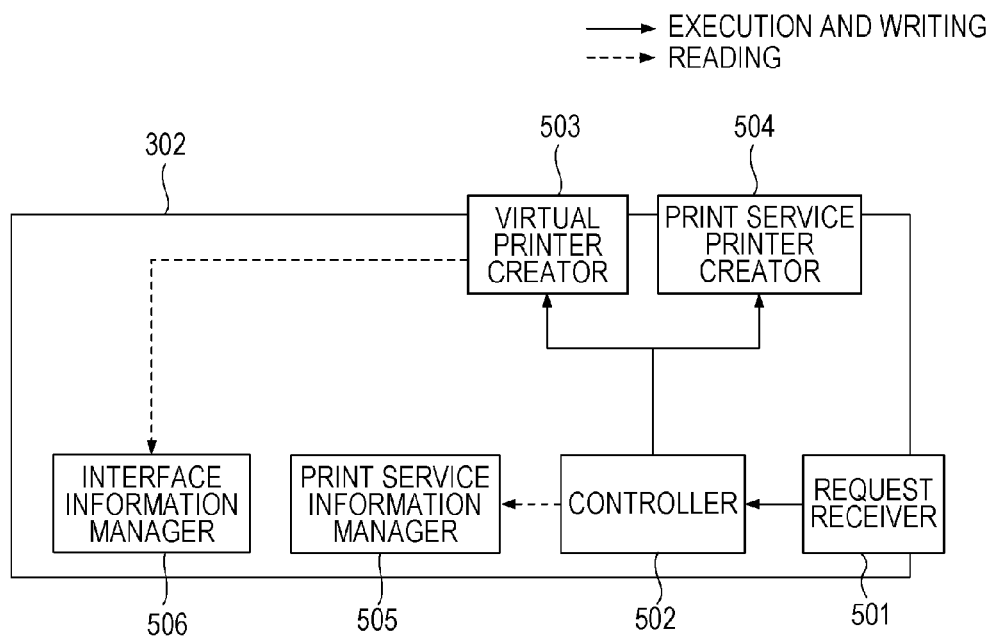
FIG. 5 illustrates functions realized by a relay-virtual-printer management service unit.

The function classified as the registration system of the print relay server 102 will now be described. The print relay server 102 includes the relay-virtual-printer management service unit 302. The relay-virtual-printer management service unit 302 realizes functions illustrated in FIG. 5. Referring to FIG. 5, the request receiver 501 receives the registration information. A controller 502 acquires the registration information received by the request receiver 501 to interpret the registration information. Then, the controller 502 issues an instruction to perform the following first and second processes to a virtual printer creator 503 and a print service printer creator 504. In the first process, the virtual printer creator 503 realizes the function of the relay virtual printer 303. In the second process, the print service printer creator 504 registers information about the relay virtual printer 303 in the print service 304.

The first process, that is, the process of realizing the function of the relay virtual printer 303 by the virtual printer creator 503 will now be described. The relay virtual printer 303 realizes functions illustrated in FIG. 6. The functions will be described in detail below. The virtual printer creator 503 identifies a communication module B 602 stored in an interface information manager 506 on the basis of the PrinterKind transmitted from the controller 502 to acquire the communication module B 602. In addition, the virtual printer creator 503 identifies a communication module A' 601 stored in the interface information manager 506 on the basis of the print service name to acquire the communication module A' 601. The communication module B 602 is used for communication with the image forming apparatus 101. Since the same model has the same communication module B 602, as described above, it is possible to identify the communication module B 602 from the PrinterKind. The communication module B 602 communicates with a communication module B' 410 in the print control software 301. The communication module A' 601 is used for communication with the print server group 103 and is capable of communicating with a communication module A 707 in the print service 304. Then, the virtual printer creator 503 refers to the print quality improvement function information. When the print quality improvement function is enabled, the virtual printer creator 503 performs the following processing: the virtual printer creator 503 identifies a communication module C 603 stored in the interface information manager 506 to acquire the communication module C 603. The communication module C 603 is capable of communicating with a communication module C' (not shown) in a Web application 306.

After acquiring the two or more communication modules, the virtual printer creator 503 realizes a process (thread) in which the two or more communication modules are loaded. This process corresponds to the relay virtual printer 303.

After realizing the relay virtual printer 303, the virtual printer creator 503 issues a Virtual Printer ID (VPID), which is the identification information for identifying the relay virtual printer 303 that is realized. The VPID that is issued is supplied to the controller 502. The relay virtual printer 303 is realized each time the registration information is transmitted from the image forming apparatus 101 and the specific VPID is allocated to each relay virtual printer that is realized. In the first embodiment, the VPID can be identified to identify the location where the relay virtual printer 303 is arranged. The second process, that is, the process of registering information about the relay virtual printer 303 in the print service 304 by the print service printer creator 504 will now be described. The controller 502 supplies the user information to the print service printer creator 504. The print service printer creator 504 authenticates the print server group 103 on the basis of the received user information. If the authentication succeeds, the print service printer creator 504 transmits the printer name, the Capabilities, and the VPID to the print service 304. The print service printer creator 504 receives a Service Printer ID (SPID) as a response from the print service 304. The SPID will be described below. The controller 502 acquires the VPID and the SPID from the virtual printer creator 503 and the print service printer creator 504. The controller 502, which has received the VPID and the SPID, instructs a print service information manager 505 to store the VPID and the SPID. The print service information manager 505 stores the VPID, the SPID, and the registration information that are associated with each other, as illustrated in an example in FIG. 8B. In the example in FIG. 8B, reference numeral 1301 denotes the VPID, reference numeral 1302 denotes the print service name, reference numeral 1303 denotes the RPID, reference numeral 1304 denotes the PrinterKind, reference numeral 1305 denotes the SPID, and reference numeral 1306 denotes the printer name.

The function classified as the registration system of the print server group 103 will now be described. The print server group 103 includes the print service 304. The print server group 103 virtualizes multiple servers as one server and realizes the function of the print service 304 with the server. The print server group 103 activates multiple virtual machines in the server to realize the function of the print service 304 for the respective virtual machines. The print service 304 in FIG. 3 illustrates one print service.

The print service 304 realizes functions illustrated in FIG. 7. Referring to FIG. 7, a printer information registration part 701 receives the user information from the print service printer creator 504. The printer information registration part 701 reads out the user information stored in the Web application 306 in the Web application server group 105 to confirm whether the received user information exists. If the user information exits, the printer information registration part 701 determines that the authentication succeeds, receives the printer name, the Capabilities, and the VPID from the print service printer creator 504, and instructs a printer information storage part 702 to store the received VPID. The printer information registration part 701 issues the SPID corresponding to the VPID and supplies the issued SPID to the printer information storage part 702 and the print service printer creator 504. The printer information storage part 702 stores the printer name, the Capabilities, the VPID, the SPID, the user ID, and the password associated with each other. FIG. 8C illustrates an example of the information stored in the printer information storage part 702. In the example in FIG. 8C, reference numeral 1401 denotes the SPID, reference numeral 1402 denotes the printer name, reference numeral 1403 denotes the Capabilities, reference numeral 1404 denotes the VPID, reference numeral 1405 denotes the user ID, and reference numeral 1406 denotes the password. The remaining functions will be described below. The function classified as the registration system is performed in the above manner to register the image forming apparatus 101 in the print relay server 102, realize the relay virtual printer 303 in the print relay server 102, and register the relay virtual printer 303 in the print service 304.

Next, the functions classified as the printing system is described. First, the function classified as the printing system of the client computer 104 will now be described. The client computer 104 includes a Web browser 305. The Web browser 305 transmits an instruction to print content stored in the Web application server group 105 to the Web application server group 105. The Web browser 305 receives an access instruction to the print server group 103, that is, a redirect instruction from the Web application server group 105 to access the print server group 103 in accordance with the received redirect instruction. The Web browser 305 acquires a list of image forming apparatuses that can be used for the printing by the user using the Web browser 305 from the print server group 103 that is accessed to display the list. The Web browser 305 acquires a print setup UI corresponding to the image forming apparatus that is selected by the user from the list from the print server group 103 to display the print setup UI. FIG. 9B illustrates an example of the print setup UI that corresponds to the image forming apparatus selected by the user and that is displayed in the Web browser 305. The Web browser 305 transmits print setting values set by the user on the print setup UI to the print server group 103. The Web browser 305 in the client computer 104 has the above function.

The function classified as the printing system of the Web application server group 105 will now be described. The Web application server group 105 includes the Web application 306. The Web application server group 105 virtualizes multiple servers as one server and realizes the function of the Web application 306 with the server. The Web application server group 105 activates multiple virtual machines in the server to realize the function of the Web application 306 for the respective virtual machines.

The Web application 306 provides a Web service concerning creation of a document. The user uses the document creation service to create a document, for example, when the user wants to distribute the document in a meeting in a company. When the client computer 104 uses the Web application 306, it is not necessary to install the application in the client computer 104 and it is sufficient for the client computer 104 to have the Web browser 305. The Web application 306 transmits screen information to create the document to the Web browser 305. The Web application 306 performs the authentication on the basis of the user information including the user ID and the password input by the user with the Web browser 305 and, if the authentication succeeds, transmits the screen information to create the document. The Web browser 305, which has received the screen information, creates a document creation UI for creating a document on the basis of the screen information and the user creates the document to be distributed in the meeting by using the document creation UI. The Web application 306 receives information on the document created by the user using the document creation UI, creates content on the basis of the received information, and stores content data corresponding to the created content in a storage unit in the Web application server group 105. Here, the user inputs a title of the content. When multiple pieces of content that are created are stored, the same title may be given to the respective pieces of content. In such a case, content identification information is allocated to each piece of content data corresponding to each piece of content so as to uniquely identify the content and the pieces of content data are stored in various formats. For example, the formats include a common word processor document, a spreadsheet document, a presentation document, Portable Document Format (PDF), and a Hyper Text Markup Language (HTML) format. The Web application 306 also provides a mail service and a scheduling service, in addition to the document creation service.

Figure 12:
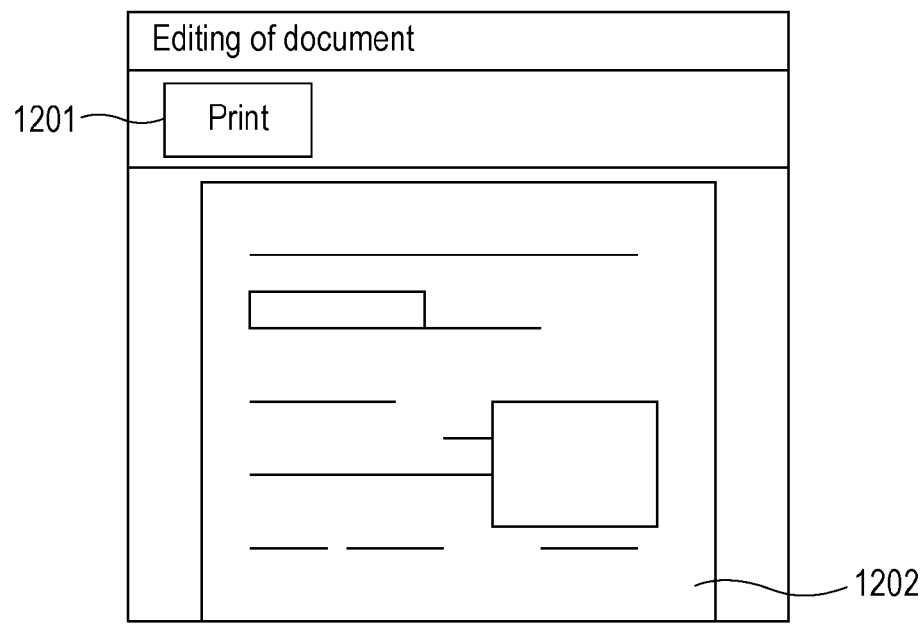
FIG. 12 illustrates a state in which a Print button is pressed.

The user who wants to print the content that is created by using the document creation service presses a Print button displayed on the document creation UI. FIG. 12 illustrates a state in which a Print button 1201 is pressed. Referring to FIG. 12, reference numeral 1202 denotes content created by the user. The Web application 306 receives information indicating that the Print button is pressed to transmit an instruction to access the print server group 103, that is, a redirect instruction to the Web browser 305. The redirect instruction includes a request to acquire the list corresponding to the user using the Web browser 305, the content identification information for identifying the content of which the user has instructed the printing, and the user information. Upon reception of a request to acquire the print data from the print server group 103, the Web application 306 transmits print data identification information for identifying the print data to the print server group 103. In the first embodiment, the print data is the content in the PDF. Accordingly, the print data identification information is the identification information concerning the content in the PDF.

As described above, the Web application 306 also provides the mail service and the scheduling service, in addition to the document creation service. Pieces of content created with the services provided by the Web application 306 can be used from a program or a service provided by a third party through the interface of the Web application 306. Since the Web application 306 holds the pieces of content in various formats, the pieces of content can be acquired through the above interface in the various formats. The Web application 306 in the Web application server group 105 functions in the above manner.

The function classified as the printing system of the print server group 103 will now be described. As illustrated in FIG. 7, the print service 304 in the print server group 103 includes a printer information presentation part 703. The printer information presentation part 703 transmits a list to the Web browser 305 in response to reception of a request to acquire the list from the Web browser 305. The printer information presentation part 703 identifies the SPID and the printer name stored in the printer information storage part 702 on the basis of the user information. The printer information presentation part 703 creates the list of image forming apparatuses available by the user on the basis of the SPID and the printer name. The printer information presentation part 703 receives the SPID of an image forming apparatus selected from the list by the user. The printer information presentation part 703 identifies the Capabilities stored in the printer information storage part 702 on the basis of the received SPID, creates the print setup UI, and transmits the created print setup UI to the Web browser 305. The printer information storage part 702 creates the print setup UI illustrated in FIG. 9B from the information about the Capabilities illustrated in FIG. 8C. As illustrated in FIG. 9B, the printer information storage part 702 creates the print setup UI in which only the print setting described in the Capabilities can be selected. A print instruction receiver 704 receives the print setting set with the print setup UI and the SPID from the Web browser 305. The print instruction receiver 704 receives the print data identification information for identifying the print data of which the user has instructed the printing upon access of the Web browser 305 on the basis of the redirect instruction.

A print data information acquirer 705 receives the print data identification information from the print instruction receiver 704. In addition, the print data information acquirer 705 receives the print setting input by the user and the SPID corresponding to the image forming apparatus selected by the user from the print instruction receiver 704. A controller 706 acquires the print data identification information, the print setting, and the SPID from the print data information acquirer 705. The print setting is described in the XML format, as illustrated in an example in FIG. 10B. In the example in FIG. 10B, the user sets a duplex setting, a monochrome setting, and a sheet size A4. The communication module A 707 is capable of communicating with an apparatus having the communication module A' 601 and servers as an interface of the data communication between the communication module A 707 and the communication module A' 601. The communication module A' 601 communicates with the communication module A 707. The reason for this communication will be described below after the function of the communication module A 707 is described.

The communication module A 707 includes a print data identification information storage part 708, a print setting information storage part 709, and a print job notifier 710. The print data identification information storage part 708 receives the print data identification information from the controller 706 and stores the received print data identification information. The print setting information storage part 709 receives the print setting from the controller 706 and stores the received print setting. The print data identification information storage part 708 and the print setting information storage part 709 receives a storage instruction from the controller 706 to store the print data and the print setting, respectively. The controller 706 instructs the print job notifier 710 to transmit notification information upon reception of a notification that the storage is completed from the print data identification information storage part 708 and the print setting information storage part 709. The print job notifier 710 acquires the SPID from the controller 706 in response to the instruction to transmit the notification information from the controller 706 and identifies the VPID on the basis of the information stored in the printer information storage part 702. Information of a destination corresponding to the SPID, that is, the VPID in the first embodiment is called a target. The user selects the SPID to specify the VPID. The print job notifier 710 acquires the location where the print data is stored and the location where the print setting is stored from the controller 706, generates notification information A, and transmits the notification information A to the image forming apparatus that is registered.

The information transmitted from the print job notifier 710 corresponds to the information about data. Although the information about data in the first embodiment is the notification information A, other information and/or data may be included in the information about data depending on the communication specifications. The same applies to notification information B described below. The image forming apparatus that is registered refers to the relay virtual printer corresponding to the VPID in the first embodiment. The notification information A is described in the XML format, as illustrated in an example in FIG. 10C. Referring to FIG. 10C, reference numeral 1701 denotes the location where the print data is stored and reference numeral 1702 denotes the location where the print setting is stored. The notification information is transmitted from the print server in order to provide the print data to the destination and includes common information commonly added to both the content data and the print data. The common information will be described below. In the example in FIG. 10C, "Doc1" described in an item <title> corresponds to the common information. The notification information B is described in a JavaScript Object Notation (JSON) format, as illustrated in an example in FIG. 11.

The reason why communication modules other than the communication module A' are not capable of communicating with the communication module A will now be described. This is because the communication modules other than the communication module A' are not capable of interpreting the notification information A described in the XML format, transmitted from the print job notifier 710. The communication modules other than the communication module A' are not capable of communicating with the communication module A also in the following case. For example, when the communication module A does not include the print job notifier 710 and causes the communication module A' to acquire the print data and the print setting in another method, the communication module A' acquiring the notification information A is not capable of acquiring the print data and the print setting. This is because the communication module A' that is to acquire the notification information A waits for the notification information A from the communication module A, it is not possible for the communication module A' to acquire the print data and the print setting unless the notification information A is notified. The communication module A' capable of communicating with the communication module A is required to have a configuration to inquire of the communication module A whether the data to be acquired exists. As described above, there are cases in which the communication module A is not capable of communicating with the communication module A' because the communication module A' does not support the data communication standard of the communication module A. A mechanism to cause the communication module A to be capable of communicating with the communication module A' is called the specifications of a vendor providing the print server group 103. The specifications deeply depend on the vendor managing the print server group 103.

The vendor managing the print server group 103 installs the communication module A in the print server group 103 and releases the communication module A' for the communication with the communication module A. Such a system is practically being established in recent years and the vendor managing the print server group 103 releases specific specifications for the data communication between the print server group 103 and a device. It is necessary for a device vendor of the image forming apparatus 101 to install the communication module A' in the image forming apparatus 101 in order for the image forming apparatus 101 to communicate with the print server group 103. Here, it is assumed that the vendor managing the print server group 103 changes the configuration of the communication module A. In other words, it is assumed that the vendor managing the print server group 103 changes the specifications. In this case, it is necessary for the device vendor to change the communication module A' in the image forming apparatus 101 in accordance with the change of the specifications. This operation has a higher load. This is because the image forming apparatuses are arranged in various customer environments and a service man is required to go off to the various customer environments to change the communication module A' in order to realize the communication between the print server group 103 and the image forming apparatus again. Although there are methods of distributing the communication module A' without using the service man, it is necessary to distribute the communication module A' to multiple image forming apparatuses and, thus, a load is applied on the communication band. However, this problem is resolved by using the function classified as the printing system of the print relay server 102 described below. The specifications of the data communication released by the vendor managing the print server group 103 correspond to first specifications. The interfaces of the communication module A and the communication module A' are created in accordance with the first specifications.

Figure 6:
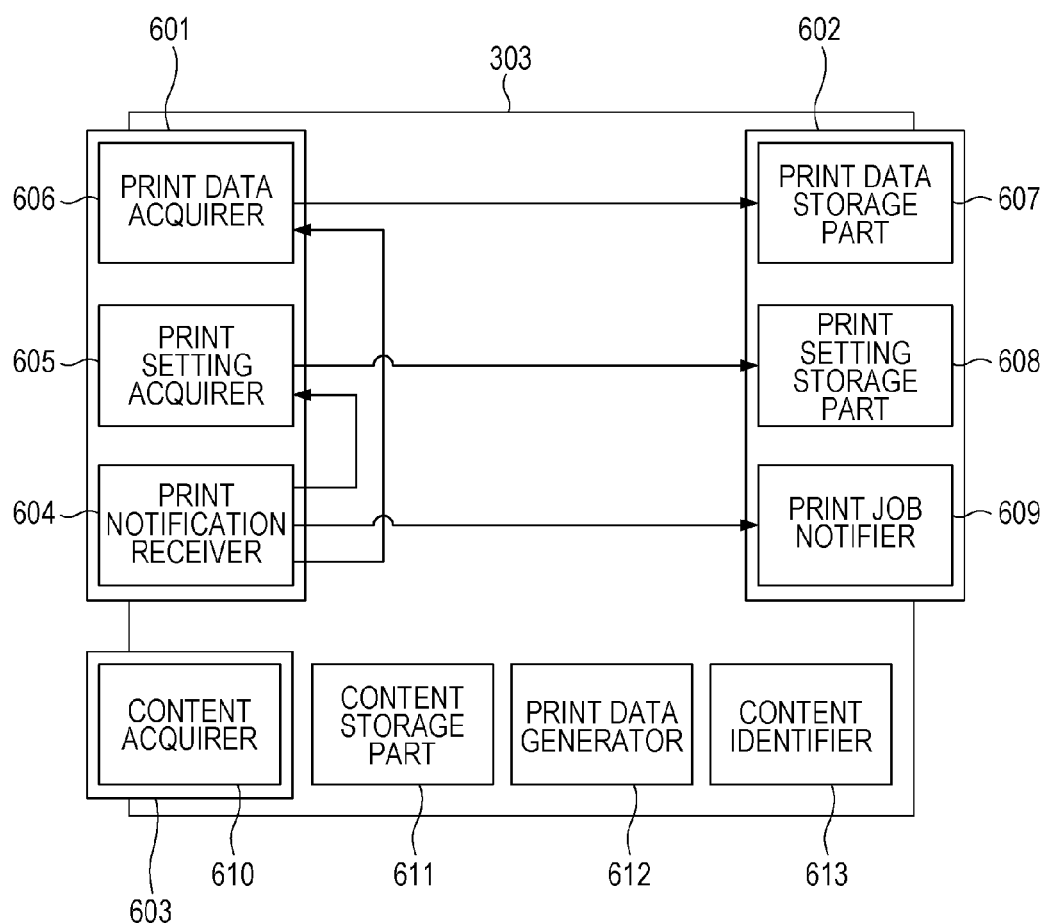
FIG. 6 illustrates functions realized by a relay virtual printer.

The function classified as the printing system of the print relay server 102 will now be described. As illustrated in FIG. 6, the relay virtual printer 303 includes the communication module A' 601 and the communication module B 602. A print notification receiver 604 in the communication module A' 601 receives the notification information A transmitted from the print job notifier 710. Since the RPID of the image forming apparatus 101 is not registered in the print service 304 but the relay virtual printer 303 is registered in the print service 304, the notification information A is transmitted to the print notification receiver 604. Since the communication module A' is paired with the communication module A, the print notification receiver 604 is capable of interpreting the notification information A. The print notification receiver 604 confirms the locations where the print data and the print setting described in the notification information A are stored and notifies a print setting acquirer 605 and a print data acquirer 606 of the information. The print setting acquirer 605 acquires the print setting from the print setting information storage part 709 on the basis of the notified location where the print setting is stored. The print data acquirer 606 acquires the print data from the print data identification information storage part 708 on the basis of the notified location where the print data is stored.

The print data acquirer 606 instructs a print data storage part 607 to store the print data acquired by the print data acquirer 606. The print setting acquirer 605 instructs a print setting storage part 608 to store the print setting acquired by the print setting acquirer 605. The print data storage part 607 stores the print data and notifies a print job notifier 609 of the location where the print data is stored. The print setting storage part 608 stores the print setting and notifies the print job notifier 609 of the location where the print setting is stored. The print job notifier 609 generates the notification information B upon reception of the notification indicating the location where the print data is stored and the notification indicating the location where the print setting is stored from the print data storage part 607 and the print setting storage part 608, respectively. The notification information B is represented in the XML format, as illustrated in an example in FIG. 10D. Referring to FIG. 10D, reference numeral 1703 denotes the location where the print data is stored and reference numeral 1704 denotes the location where the print setting is stored. The print job notifier 609 transmits the notification information B to the print control software 301. The communication module A' 601 including the print notification receiver 604 passes the print data and the print setting to the communication module B 602 including the print job notifier 609 to realize the communication between the modules in the above manner.

The communication module B' corresponding to the communication module B is installed in the image forming apparatus 101. As described above, the image forming apparatus 101 acquires the print data from the print service 304. Accordingly, even if the communication module A' is changed in accordance with the change of the communication module A, the communication module A' in the print relay server 102 can be changed to transmit the notification information to the image forming apparatus 101. In other words, even if the vendor managing the print server group 103 changes the specific specifications for the data communication between the print server group 103 and the image forming apparatus 101, it is not necessary for the device vendor to change the communication module of the image forming apparatus 101. The device vendor can change the relay virtual printer 303 in the print relay server 102 to cause the image forming apparatuses arranged in the various user environments to communicate with the print server group 103. The relay virtual printer 303 may be changed by discarding the existing relay virtual printer 303 and creating the new relay virtual printer 303, instead of the change of the communication module A' in the relay virtual printer 303.

A content acquirer 610 acquires content from the Web application 306. The content acquirer 610 is capable of acquiring a list of documents and/or content in accordance with the interface provided by the Web application 306. The content acquirer 610 stores the acquired content in a content storage part 611. A print data generator 612 converts the content stored in the content storage part 611 into the print data and stores the print data in the print data storage part 607. In the storage or the generation of the print data, the print data to which the date and time when the print data is generated and the title of the print data are added is stored. The title of the print data is added so as to be equal to the title of the content data. Accordingly, the title is the common information commonly added to both the content data and the print data.

The communication module C' corresponding to the communication module C is installed in the Web application 306 (not shown). The print relay server 102 determines the content which the content acquirer 610 in the communication module C 603 requests on the basis of the information received with the print notification receiver 604 in the communication module A' 601. Accordingly, the print relay server 102 is capable of acquiring the content that has not been converted into the print data by the print service 304 from the Web application 306.

A content identifier 613 is invoked to identify the content on which the print data is based in the acquisition of the content by the content acquirer 610. The content identifier 613 identifies the content on which the print data is based from the title of the print data or information indicating the location where the print data exists. A process of identifying the content will be described below with reference to FIG. 15.

The function classified as the printing system of the image forming apparatus 101 will now be described. As illustrated in FIG. 4, the print control software 301 includes the communication module B' 410. A print notification receiver 404 in the communication module B' 410 receives the notification information B transmitted from the print job notifier 609. Since the communication module B' is paired with the communication module B, the print notification receiver 404 is capable of interpreting the notification information B. The specifications defined by the device vendor for the data communication between the relay virtual printer 303 and the image forming apparatus 101 correspond to second specifications and can be handled by the device vendor. The interfaces of the communication module B and the communication module B' are created in accordance with the second specifications.

The print notification receiver 404 confirms the locations where the print setting and the print data described in the notification information B are stored and notifies a print setting acquirer 405 and a print data acquirer 406 of the information about the locations. The print setting acquirer 405 acquires the print setting from the print setting storage part 608 on the basis of the notified location where the print setting is stored. The print data acquirer 406 acquires the print data from the print data storage part 607 on the basis of the notified location where the print data is stored. The print setting and the print data that are acquired are supplied to a job manager 407 through the print notification receiver 404. The job manager 407 acquires the information about the print data and the print setting and instructs a print executer 408 to execute the printing. The print executer 408 generates a raster image on the basis of the print setting and the print data upon reception of the instruction and instructs the print unit to print the generated raster image. The printing system in which the instruction to print the content generated in the Web application server group 105 is transmitted to the print server group 103 and the image forming apparatus 101 is caused to print the print data on the basis of the print notification transmitted from the print server group 103 operates in the above manner.

Figure 13:
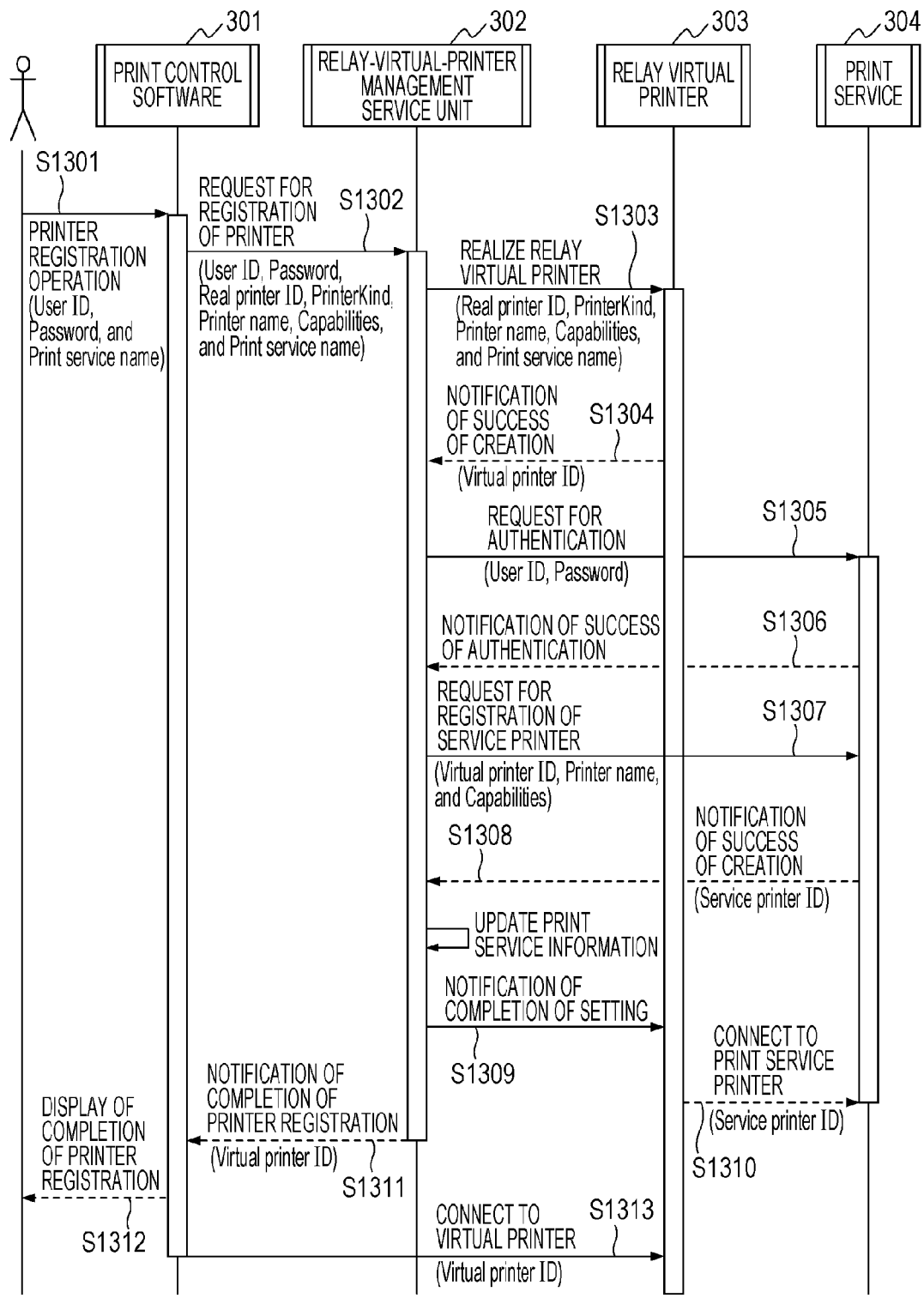
FIG. 13 is a sequence chart illustrating an example of a process of registering the relay virtual printer in the print service according to the first embodiment.

FIG. 13 is a sequence chart illustrating an example of a process of registering the image forming apparatus 101 in the print relay server 102, realizing the relay virtual printer 303 in the print relay server 102, and registering the relay virtual printer 303 in the print service 304. Referring to FIG. 13, in S1301, the user selects a print service which the user wants to register from the UI of the image forming apparatus 101 and inputs the user ID and the password. In S1302, the print control software 301 in the image forming apparatus 101 requests the relay-virtual-printer management service unit 302 to register the printer. The print control software 301 transmits the registration information described above to the relay-virtual-printer management service unit 302. In S1303, the relay-virtual-printer management service unit 302 realizes the relay virtual printer 303 on the basis of the registration information. In S1304, the relay virtual printer 303 transmits the VPID to the relay-virtual-printer management service unit 302 as a notification that the creation of the relay virtual printer 303 succeeds. In S1305, the relay-virtual-printer management service unit 302 transmits the user ID and the password to the print service 304 to accept the authentication. If the authentication by the print service 304 succeeds, in S1306, the print service 304 notifies the relay-virtual-printer management service unit 302 that the authentication succeeds. In S1307, the relay-virtual-printer management service unit 302 requests the print service 304 to register the VPID as the printer (service printer) to be provided to the user. In S1308, the print service 304 issues the SPID in response to the registration of the VPID as the service printer and transmits the SPID to the relay-virtual-printer management service unit 302.

In S1309, the relay-virtual-printer management service unit 302 instructs the print service information manager 505 to store the SPID and notifies the relay virtual printer 303 that the setting is completed. In S1310, the relay virtual printer 303 connects to the communication module A in the print service 304 on the basis of the SPID and waits for transmission of the notification information A. In S1311, the relay-virtual-printer management service unit 302 notifies the print control software 301 that the registration of the printer is completed. In S1312, the print control software 301 instructs the UI of the image forming apparatus 101 to display the completion of the registration of the image forming apparatus. In S1313, the print control software 301 connects to the relay virtual printer 303 on the basis of the VPID and waits for transmission of the notification information B. The registration process is performed in the above manner.

Figure 14:
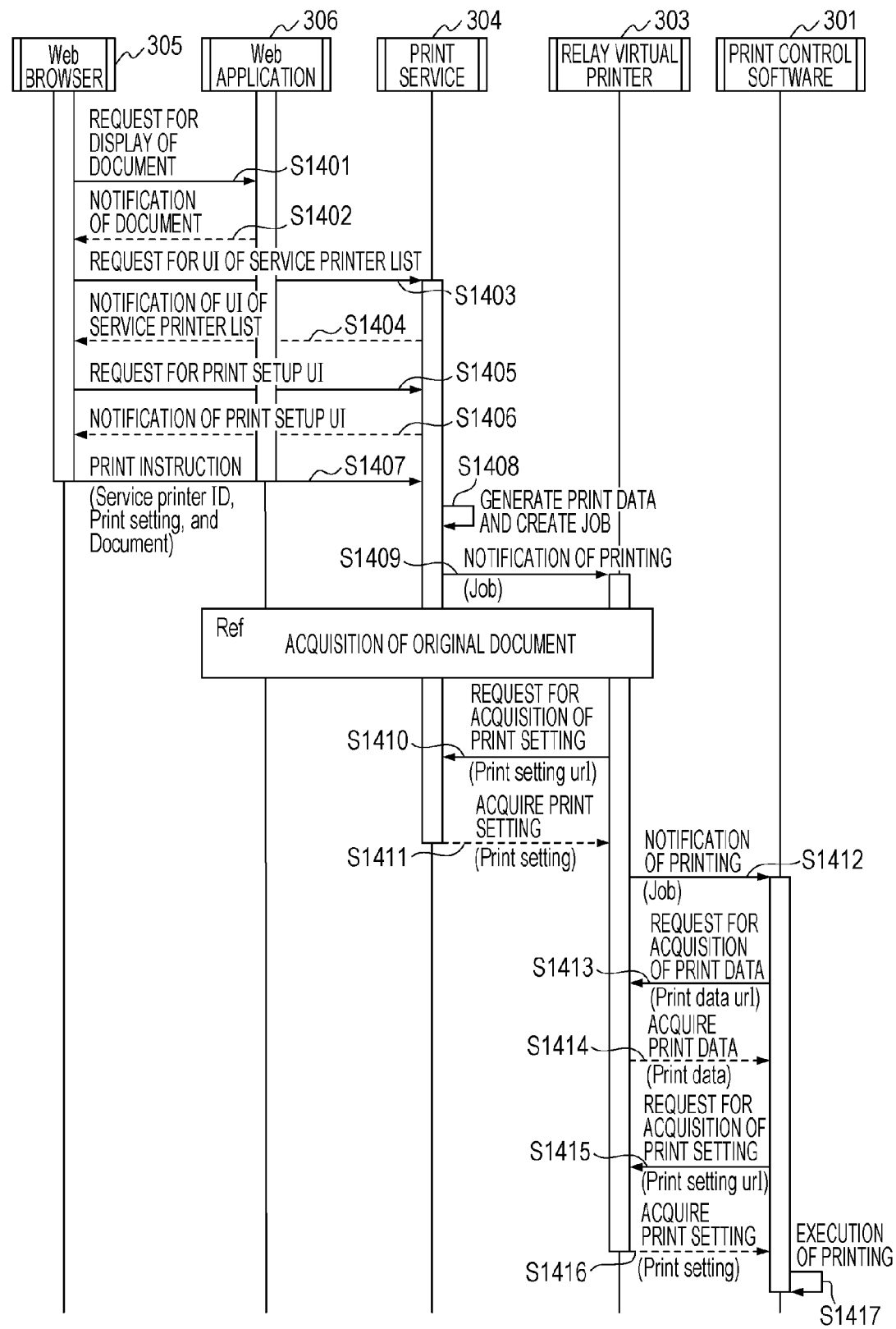
FIG. 14 is a sequence chart illustrating an example of a process before printing is performed by an image forming apparatus after a printing instruction is issued by a Web application according to the first embodiment.

FIG. 14 is a sequence chart illustrating an example of a process of transmitting an instruction to print content data generated in the Web application server group 105 to the print server group 103 and causing the image forming apparatus 101 to print print data transmitted from the print server group 103. Referring to FIG. 14, in S1401, the Web browser 305 requests the Web application 306 to display content data which the user wants to edit. In S1402, the Web application 306 transmits a content data UI corresponding to the requested content data to the Web browser 305. In S1403, the Web browser 305 requests a UI of a list of image forming apparatuses (service printers) registered in the print service 304 in response to a print instruction by the user with the content data UI. In S1404, the print service 304 transmits the UI of the list of the service printers corresponding to the user using the Web browser 305 to the Web browser 305. In S1405, the Web browser 305 requests a print setup UI corresponding to an image forming apparatus that is selected by the user from the UI of the list in response to the selection of the image forming apparatus. In S1406, the print service 304 transmits the print setup UI to the Web browser 305. In S1407, the Web browser 305 transmits a print setting input by the user with the print setup UI to the print service 304. In S1408, the print service 304 acquires the identification information about the print data of which the user instructs the printing from the Web application 306. The print service 304 creates a job in which the identification information about the print data is combined with the print setting. In S1409, the print service 304 notifies the relay virtual printer 303 that the job is created. In other words, the relay virtual printer 303 acquires the notification information.

Figure 15:
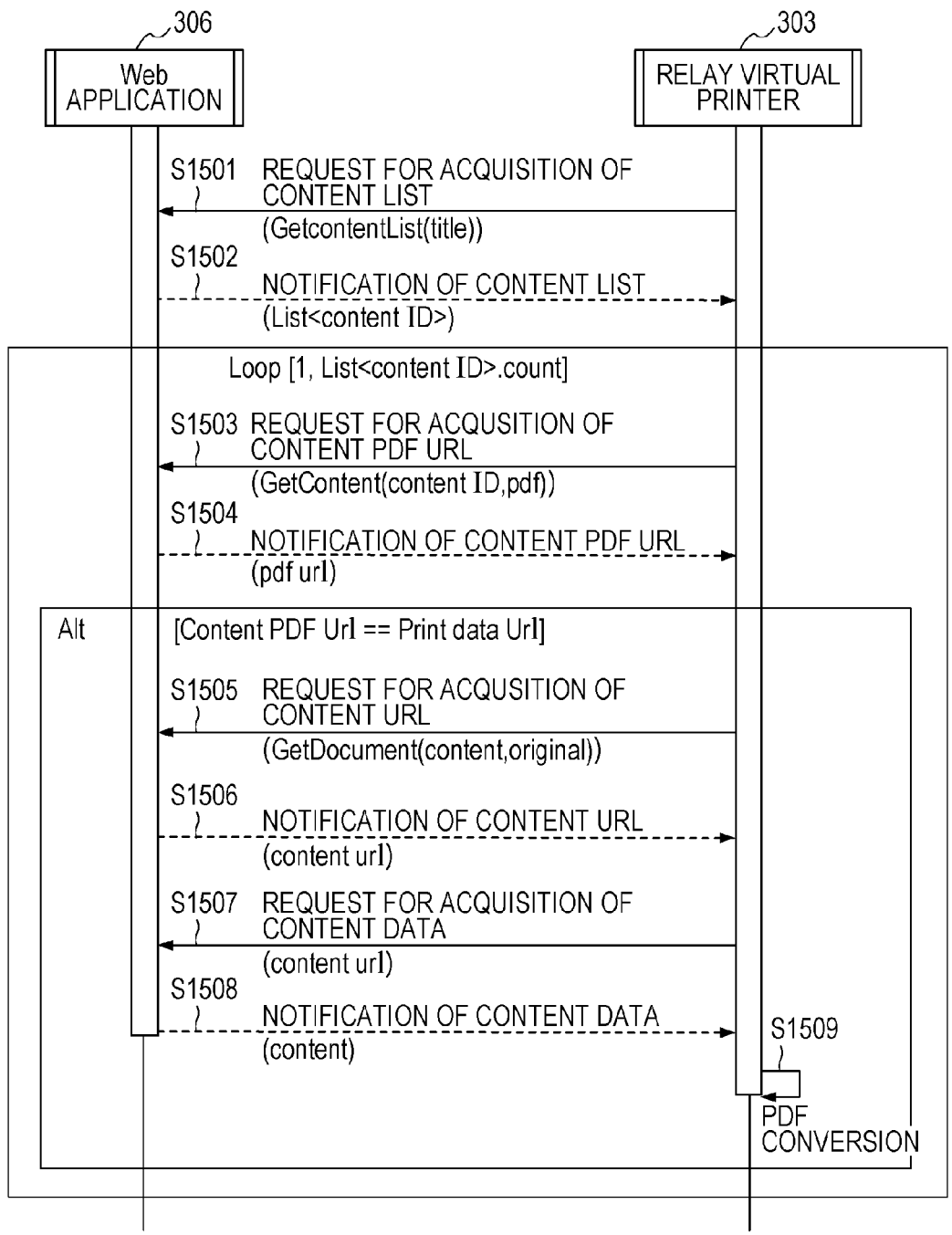
FIG. 15 is a sequence chart illustrating an example of a process of acquiring content data from the Web application by the relay virtual printer according to the first embodiment.

Then, the relay virtual printer 303 acquires content from the print service 304. In the first embodiment, the relay virtual printer 303 acquires content and converts the content into print data to realize improvement in the print quality and a reduction in data acquisition time. FIG. 15 is a sequence chart illustrating an example of a process of acquiring content data.

Referring to FIG. 15, in 1501, the relay virtual printer 303 submits a request for acquisition of a content list. Search based on the title of content allows the search to be narrowed down to the pieces of content to be printed, which have not been converted into the print data. The acquisition of a content list is requested by using the title information included in the notification information about the print data acquired by the relay virtual printer 303 in S1409, that is, the information described in the item <title> in FIG. 10C. As described above, the title is commonly used for the print data and the content and is the common information commonly given to the print data and the content. Although the content is identified with the title in the first embodiment, any information commonly used for the print data and the content may be used for the identification, instead of the title. Key information with which the content can be identified from the notification information about the print data is called the common information. The Web application 306 installs an interface for acquiring the content list from the common information.

In S1502, the Web application 306 notifies the relay virtual printer 303 of the content list. When pieces of content having the same title are not permitted in the Web application 306, the content to be printed can be identified in S1502. However, it is assumed in the first embodiment that the content to be printed cannot be uniquely identified from the title information. It is also assumed in the first embodiment that the title information that is acquired is "a" and that a content list including the content information corresponding to "a.xls", "a.doc", and "a.txt" is acquired as the content list corresponding to the title information "a". Since the content list includes at least one piece of content identification information for uniquely identifying each piece of content, the content list may be called a list of pieces of content identification information. Different pieces of content identification information correspond to "a.xls", "a.doc", and "a.txt" and the content identification information is not duplicated. Accordingly, it is possible to identify a desired piece of content from the pieces of content identification information even if the same title is given to the pieces of content identification information. The acquisition of the content list is substantially equivalent to acquisition of the content identification information.

In S1503, the relay virtual printer 303 submits a request for acquisition of a Uniform Resource Locator (URL) of content PDF data corresponding to each piece of content included in the content list on the basis of the content list acquired in S1502. Although the content PDF data is substantially equal to the print data, the print data identified from the content list is called the content PDF data. The relay virtual printer 303 is capable of acquiring the URL of the content PDF data corresponding to the content identification information included in the pieces of content information in the content list on the basis of the content identification information. The interface for acquiring the URL of the content PDF data is capable of acquiring the URL of the content PDF data on the basis of the content identification information and is installed in the Web application 306. In S1504, the Web application 306 notifies the relay virtual printer 303 of the URL for acquiring the content PDF data. The URL corresponds to location information. The location information includes the URL, a Uniform Resource Identifier (URI), or the like and is used for identifying the location where data is arranged.

In S1505, the relay virtual printer 303 invokes the interface for acquiring the URL of the content data corresponding to the content identification information if the URL of the content PDF data acquired in S1504 coincides with the URL of the print data described in the notification information. If the URL of the content PDF data acquired in S1504 does not coincide with the URL of the print data described in the notification information, the process goes back to S1503. The URL of the print data described in the notification information is the URL described in "dataURL" in FIG. 10C. The interface for acquiring the URL of the content data is capable of acquiring the URL of the content data on the basis of the content identification information and is installed in the Web application 306. S1505 is repeated until the URL of the content PDF data coincides with the URL of the print data or until it is determined that the URLs of all the acquired pieces of content PDF data do not coincide with the URL of the print data. If the URL of the print data does not coincide with the URLs of all the pieces of content PDF data, the process is terminated in S1505. If the URL of the content PDF data acquired in S1504 coincides with the URL of the print data described in the notification information, the relay virtual printer 303 uses the content identification information corresponding to the URL of the content PDF data to move to a step of acquiring the URL of the content data. If the URL of the content PDF data acquired in S1504 does not coincide with the URL of the print data described in the notification information, the relay virtual printer 303 acquires the print data from the print server group 103 on the basis of the URL of the print data included in the notification information.

In S1506, the Web application 306 notifies the relay virtual printer 303 that has requested the acquisition of the content data on the basis of the content identification information identified in S1505 of the URL of the content data requested from the relay virtual printer 303. In S1507, the relay virtual printer 303 invokes the interface for acquiring the content data to acquire the content data corresponding to the content identification information. The relay virtual printer 303 is capable of acquiring the content data from the Web application 306 by using the invoked interface. The interface for acquiring the content data is capable of acquiring the content data on the basis of the content identification information and is installed in the Web application 306.

In S1508, the Web application 306 transmits the content data requested in S1507 to the relay virtual printer 303. In S1509, the relay virtual printer 303 converts the content data acquired in S1508 into the print data to generate the print data. When the content data is generated and the generated content data is transmitted to the image forming apparatus 101, the content data is transmitted without provision of the print data from the print server group 103. In other words, the print relay server 102 does not acquire the print data in accordance with the notification information from the print server group 103 in this case. The process of acquiring the original document is performed in the above manner.

The above process is performed in the first embodiment when the enabling of the print quality improvement function is selected by the user in advance. If the print quality improvement function is not enabled, the relay virtual printer 303 acquires the print data from the print service 304 in accordance with the job received in S1409. S1410 and the subsequent steps in FIG. 14 are subsequently performed. In S1410, the relay virtual printer 303 submits a request for acquisition of the print setting to the print service 304. In S1411, the relay virtual printer 303 acquires the print setting from the print service 304.

In S1412, the relay virtual printer 303 notifies the print control software 301 of the creation of the job. In S1413, the print control software 301 submits a request for acquisition of the print data to the relay virtual printer 303. In S1414, the print control software 301 acquires the print data transmitted from the relay virtual printer 303. In S1415, the print control software 301 submits a request for acquisition of the print setting to the relay virtual printer 303. In S1416, the print control software 301 acquires the print setting from the relay virtual printer 303. In S1417, the print control software 301 draws a raster image on the basis of the print setting and the print data that are acquired and causes the image forming apparatus 101 to print the raster image.

Second Embodiment

In a second embodiment, a method of acquiring print data provided by a Web service or content by the relay virtual printer 303 to realize the printing at higher speed will be described. The relay virtual printer 303 of the first embodiment acquires the content from the Web application 306 and converts the acquired content into the print data to avoid the longer time to acquire the print data of a larger size. However, more strictly, there are cases in which the size of the print data coincides with that of the content data or the size of the print data is substantially equal to that of the content data. Since it takes a time to convert the content into the print data by the relay virtual printer 303 in such a case, the time to complete the printing may be shortened by using the interface of the print service to acquire the print data. Accordingly, in the second embodiment, the sizes of the print data of the print service 304 and the content data of the Web application 306 are confirmed before the print data or the content data is acquired and the data having a smaller size is acquired.

Figure 16:
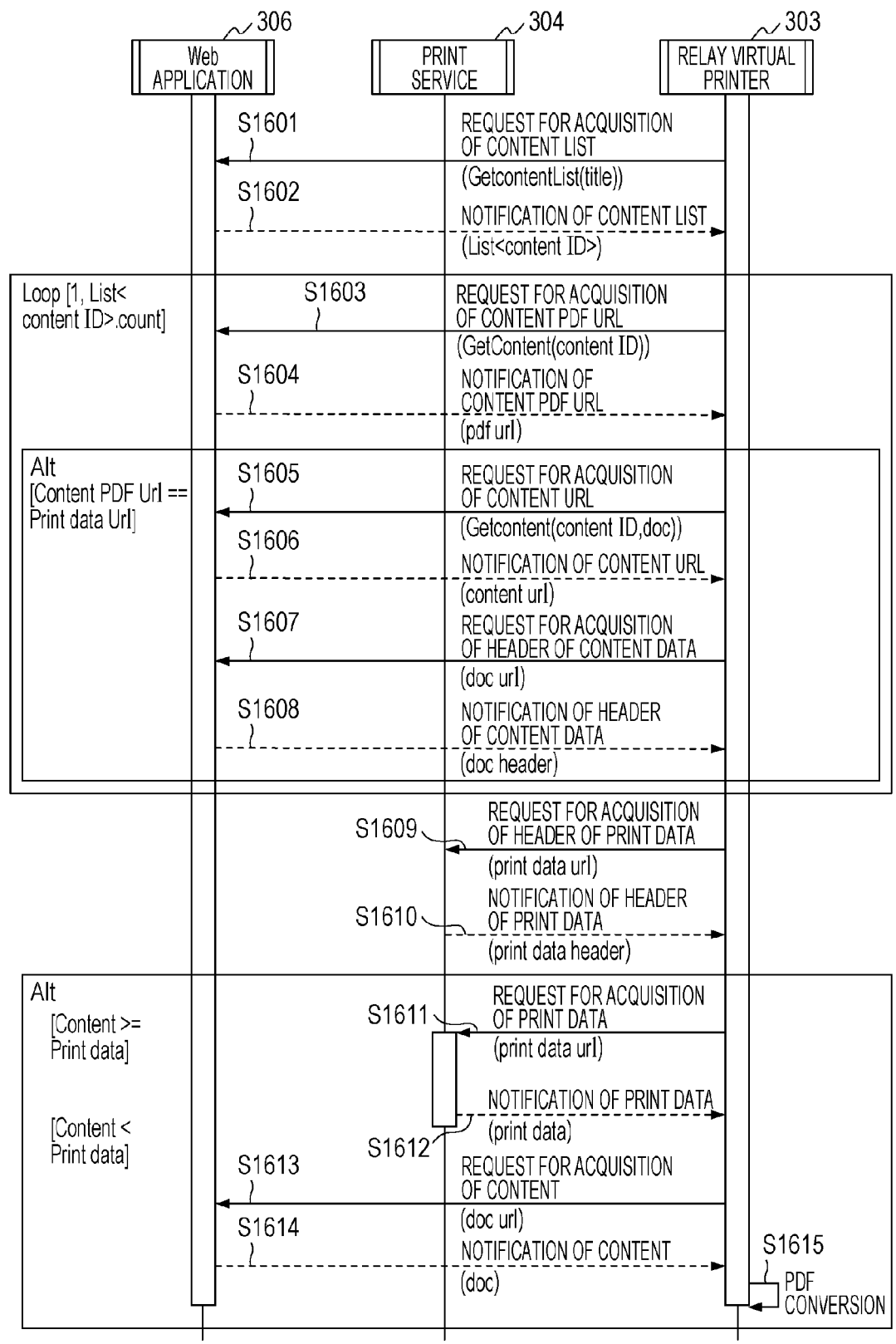
FIG. 16 is a sequence chart illustrating an example of a process of comparing the size of print data held in the print service with the size of content data held in the Web application to acquire the data of a smaller size by priority according to a second embodiment.

FIG. 16 is a sequence chart illustrating an example of a process in the second embodiment. Since S1601 to S1606 in FIG. 16 are the same as S1501 to S1506 in FIG. 15, a description of S1601 to S1606 is omitted herein.

In S1607, the relay virtual printer 303 submits a request for acquisition of a header of the content data on the basis of the content identification information. The header in the second embodiment means the header of a HyperText Transfer Protocol (HTTP). It is possible to confirm the size of the content data to be acquired in advance by referring to the header. The interface for acquiring the size of the content data is capable of acquiring the size of the content data on the basis of the content identification information and is installed in the Web application 306.

In S1608, the Web application 306 transmits the header of the content data to the relay virtual printer 303. In S1609, the relay virtual printer 303 submits a request for acquisition of a header of the print data to the print service 304. It is possible to confirm the size of the print data to be acquired in advance by referring to the header. The interface for acquiring the size of the print data is capable of acquiring the size of the print data on the basis of the URL of the print data and is installed in the Web application 306.

In S1610, the print service 304 transmits the header of the print data to the relay virtual printer 303. The relay virtual printer 303 compares the size of the content data with the size of the print data. If the size of the content data is larger than or equal to that of the print data, the process goes to S1611. If the size of the content data is smaller than that of the print data, the process branches to S1612. The process may go to S1612 if the size of the content data is equal to that of the print data.

In S1611, the relay virtual printer 303 submits a request for acquisition of the print data to the print service 304 on the basis of the URL of the print data. In S1612, the print service 304 transmits the print data to the relay virtual printer 303. In S1613, the relay virtual printer 303 submits a request for acquisition of the content to the Web application 306 on the basis of the URL of the content data. In S1614, the Web application 306 transmits the content to the relay virtual printer 303. In S1615, the relay virtual printer 303 converts the content acquired in S1614 into the print data.

As described above, it is confirmed in advance in the second embodiment whether the data is to be acquired from the Web application 306 or the print service 304 by referring to the header. Since the relay virtual printer 303 can select an efficient method of acquiring the data before the printing is completed to acquire the data having a smaller size, it is possible to reduce the time before the completion of the printing.

Other Embodiments

Although the process in FIG. 15 in the first embodiment is performed when the print quality improvement function is enabled, the print quality improvement function may be constantly enabled for every print service. For example, the print quality improvement function may be constantly enabled if the quality of the conversion of the content into the print data by the print service is remarkably low.

Although the process in FIG. 15 in the first embodiment is performed when the print quality improvement function is enabled, switching between the enabling and the disabling of the print quality improvement function may be performed in accordance with the capability of the image forming apparatus 101. There are cases in which the print data that can be acquired from the Web application 306 cannot be printed depending on the capability of the image forming apparatus 101. In such a case, the conversion of the print data into a format available in the image forming apparatus 101 results in duplicate conversion and it is obvious that the print quality is reduced. In order to avoid the duplicate conversion, the print relay server 102 acquires the content to convert the content into a format available in the image forming apparatus 101 if the image forming apparatus 101 is not capable of printing the print data provided by the Web application 306.

Although the process in FIG. 15 in the first embodiment is performed when the print quality improvement function is enabled, the content may be constantly acquired, in addition to the print data. It is possible to enable the print quality improvement function to perform re-printing if the quality of the conversion of the content into the print data by the print service is remarkably low and the user is not satisfied with the printout.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-096235, filed Apr. 22, 2011, which is hereby incorporated by reference herein in its entirety.

The invention claimed is:

1. A print relay server capable of communicating with an application server, a print server, and an image forming apparatus, the application server providing a Web service for generating content data to a client and storing the content data generated by the client by using the provided Web service, the print server providing print data generated on the basis of the content data stored in the application server to a destination, the image forming apparatus including a print unit that performs printing on the basis of the print data, the print relay server comprising:

a notification information acquiring unit configured to acquire notification information that is transmitted by the print server to provide the print data to the destination and that includes common information commonly added to both the content data and the print data;

an identification information acquiring unit configured to acquire content identification information for identifying the content data to which the acquired common information is added from the application server;

a data acquiring unit configured to acquire the content data corresponding to the content identification information from the application server if location information about the print data acquired on the basis of the acquired content identification information coincides with location information about the print data included in the acquired notification information;

a print data generating unit configured to generate the print data on the basis of the acquired content data; and a transmitting unit configured to transmit the print data generated by the print data generating unit to the image forming apparatus, wherein the data acquiring unit acquires a size of the content data on the basis of the acquired content identification information, acquires a size of the print data on the basis of the acquired notification information, and acquires the content data from the application server if the size of the content data is smaller than that of the print data, and otherwise acquires the print data from the print server, whereby the transmitting unit transmits print data acquired from the print server to the image forming apparatus rather than the print data generated by the print data generating unit.

2. The print relay server according to claim 1, wherein the transmitting unit transmits the print data generated by the print data generating unit to the image forming apparatus without receiving the provision of the print data from the print server when the content data is acquired from the application server.

3. The print relay server according to claim 1, wherein the data acquiring unit acquires the print data from the print server on the basis of the location information about the print data included in the notification information if the location information about the print data acquired on the basis of the acquired content identification information does not coincide with the location information about the print data included in the notification information, and
wherein the transmitting unit transmits the acquired print data to the image forming apparatus.

4. The print relay server according to claim 1, wherein a plurality of pieces of content data to which the common information is added is stored in the application server,
wherein the identification information acquiring unit acquires the corresponding content identification information for every piece of content data to which the common information is added, and
wherein the data acquiring unit confirms which location information, among the pieces of location information about the pieces of print data acquired on the basis of the plurality of pieces of content identification information that is acquired, coincides with the location information about the print data included in the acquired notification information and acquires the content data corresponding to the content identification information corresponding to the coinciding location information from the application server.

5. The print relay server according to claim 1, wherein the content identification information is uniquely allocated to each piece of content data, and the common information is a tile added to both the content data and the print data.

6. A print relay server capable of communicating with an application server, a print server, and an image forming apparatus, the application server providing a Web service for generating content data to a client and storing the content data generated by the client by using the provided Web service, the print server providing print data generated on the basis of the content data stored in the application server to a destination, the image forming apparatus performing printing on the basis of the print data, the print relay server comprising:
a notification information acquiring unit configured to acquire notification information transmitted by the print server to provide the print data to the destination;
a data acquiring unit configured to acquire the content data corresponding to content identification information for identifying the content data from the application server if location information about the print data acquired on the basis of the content identification information coincides with location information about the print data included in the acquired notification information;
a print data generating unit configured to generate the print data on the basis of the acquired content data; and
a transmitting unit configured to transmit the print data generated by the print data generating unit to the image forming apparatus,
wherein the data acquiring unit acquires a size of the content data on the basis of the content identification information, acquires a size of the print data on the basis of the acquired notification information, and acquires the content data from the application server if the size of the content data is smaller than that of the print data, and otherwise acquires the print data from the print server, whereby the print data generating unit does not generate the print data on the basis of the acquired content data and the transmitting unit transmits the print data acquired from the print server to the image forming apparatus.

7. A print relay server capable of communicating with an application server, a print server, and an image forming apparatus, the application server providing a Web service for generating content data to a client and storing the content data generated by the client by using the provided Web service, the print server providing print data generated on the basis of the content data stored in the application server to a destination, the image forming apparatus including a print unit that performs printing on the basis of the print data, the print relay server comprising:
a receiving unit configured to receive notification information transmitted from the print server to provide the print data to the destination; and
a transmitting unit configured to transmit the print data to the image forming apparatus by either of a method (a) of receiving provision of the print data from the print server on the basis of the notification information received by the receiving unit and transmitting the provided print data to the image forming apparatus and a method (b) of acquiring the content data corresponding to content identification information for identifying the content data stored in the application server if location information about the print data acquired on the basis of the content identification information coincides with location information about the print data included in the received notification, generating the print data on the basis of the acquired content data, and transmitting the generated print data to the image forming apparatus,
wherein in the method (b), the transmitting unit acquires a size of the content data on the basis of the content identification information, acquires a size of the print data on the basis of the notification information, and acquires the content data from the application server if the size of the content data is smaller than that of the print data, and otherwise transmits the print data via the method (a).

8. A printing system comprising:
an application server configured to provide a Web service for generating content data to a client and store the content data generated by the client by using the provided Web service;
a print server configured to provide print data generated on the basis of the content data stored in the application server to a destination;
a print relay server configured to transmit the print data to be provided to the destination; and
an image forming apparatus configured to perform printing on the basis of the print data, wherein the print relay server comprises:
- a notification unit configured to acquire notification information transmitted by the print server to provide the print data to the destination;
- a data acquiring unit configured to acquire the content data corresponding to content identification information for identifying the content data from the application server if location information about the print data acquired on the basis of the content identification information coincides with location information about the print data included in the acquired notification information, wherein the data acquiring unit acquires a size of the content data on the basis of the acquired content identification information, acquires a size of the print data on the basis of the acquired notification information, and acquires the content data from the application server if the size of the content data is smaller than that of the print data, and otherwise acquires the print data from the print server;
- a print data generating unit configured to generate the print data on the basis of the acquired content data acquired by the data acquiring unit; and
- a transmitting unit configured to transmit the print data generated by the print data generating unit or the print data acquired from the print server by the data acquiring unit, to the image forming apparatus.

9. A method of controlling a print relay server capable of communicating with an application server, a print server, and an image forming apparatus, the application server providing a Web service for generating content data to a client and storing the content data generated by the client by using the provided Web service, the print server providing print data generated on the basis of the content data stored in the application server to a destination, the image forming apparatus including a print unit that performs printing on the basis of the print data, the method comprising:
- a notification information acquiring step of acquiring, by a notification information acquiring unit, notification information that is transmitted by the print server to provide the print data to the destination and that includes common information commonly added to both the content data and the print data;
- an identification information acquiring step of acquiring, by an identification information acquiring unit, content identification information for identifying the content data to which the acquired common information is added from the application server;
- a data acquiring step of acquiring, by a data acquiring unit, the content data corresponding to the content identification information from the application server if location information about the print data acquired on the basis of the acquired content identification information coincides with location information about the print data included in the acquired notification information;
- generating, by a print data the print data on the basis of the acquired content data;
- transmitting, by a transmitting unit, the print data generated by the print data generating unit to the image forming apparatus,
- wherein the data acquiring step acquires a size of the content data on the basis of the acquired content identification information, acquires a size of the print data on the basis of the acquired notification information, and acquires the content data from the application server if the size of the content data is smaller than that of the print data, and otherwise acquires the print data from the print server, whereby the transmitting unit transmits the print data acquired from the print server to the image forming apparatus rather than the print data generated by the print data generating unit.

10. A non-transitory computer-readable storage medium on which is stored computer-executable code of a program that, when executed, causes a server apparatus to execute the controlling method according to claim 9.

\* \* \* \* \*